July 26, 1932.  C. B. WILLIAMS  1,868,783
WINDSHIELD CLEANER
Filed May 6, 1930
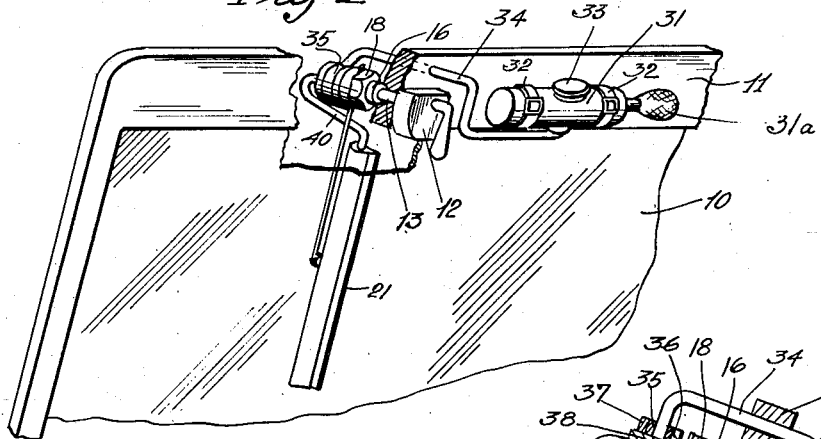
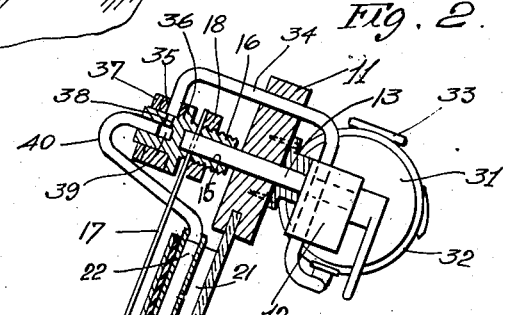
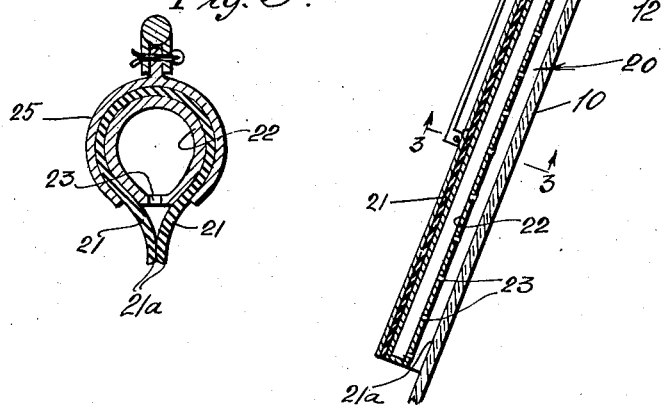
Inventor
Clarence. B. Williams.
Attorney.

Patented July 26, 1932

1,868,783

UNITED STATES PATENT OFFICE

CLARENCE B. WILLIAMS, OF SANTA BARBARA, CALIFORNIA

WINDSHIELD CLEANER

Application filed May 6, 1930. Serial No. 450,116.

This invention has to do with windshield cleaners of the type embodying a wiper rubber or squeegee which is operated to sweep over an area of the windshield glass, and is more particularly concerned with the application to such devices of means for supplying cleaning fluid to the wiper to facilitate the cleaning operation, such a device being set forth in my original application entitled "Windshield wiper", Ser. Number, 409,820, filed November 26, 1929, and the general object of the present invention being to provide devices of the character therein set forth with improved means for supplying the cleaning fluid to the wiper member.

The device described in my original application included a movable wiper rubber or squeegee having fluid passages, and a flexible liquid supply tube connected thereto, the delivery tube being necessarily flexible due to the motion of the wiper member. According to the present invention, the wiper drive shaft, which carries the usual wiper arm, carries also, on its outer end, a tubular mounting member from which leads the liquid delivery tube that feeds the wiper, and the liquid supply tube leading from the supply tank has a swivel connection with the tubular member and communicates therein with the delivery tube that leads to the wiper proper. It follows, since the wiper carrying arm and the delivery tube to the wiper are both mounted on and moved with the drive shaft, that the delivery tube has no movement with reference to the wiper and drive shaft and therefore can be a non-flexible metal tube, which is not subject to wear and deterioration.

The invention also comprises improved means for mounting the carrying arm of the wiper on the drive shaft of the device, but this feature will be left to be discussed in the body of the specification.

These and other features and objects of the invention will appear and be more fully understood from the following detailed description of a present preferred embodiment thereof, reference for this purpose being had to the accompanying drawing, in which:

Fig. 1 shows in perspective a windshield equipped with a windshield wiper to which my present invention has been applied;

Fig. 2 is a transverse section taken through the windshield and windshield wiper; and Fig. 3 is an enlarged transverse section taken on line 3—3 of Fig. 2.

Referring now to the drawing, the numeral 10 designates a windshield glass having at its upper edge a supporting frame 11. The motor case 12 of the windshield wiper is mounted, in the present instance, on the inner side of frame 11, and a drive shaft 13 reciprocatingly driven by the motor within case 12 extends through frame 11.

The outer end of shaft 13 is taken by the bore 15 of a tubular mounting member 16, member 16 being externally screw-threaded at its rear end, as shown. In assembling the device, the tubular member 16 is slipped on over shaft 13 until the shaft reaches the inner end of the bore 15. The tubular member and shaft are then drilled through to take the wiper arm 17, and a nut 18 screw-threaded on member 16 is set up against the wiper arm to clamp it securely in position. It will be seen that the nut 18 serves at once to secure both wiper arm 17 and tubular member 16 in position on shaft 13.

The free end of arm 17 carries the wiper 20. This wiper preferably comprises a pair of adjacent rubber wiper leaves or layers 21 providing a pair of scrubbing edges 21a adapted to rub or scrape against the windshield glass and a fluid discharge tube 22 located between the rubber leaves and having a line of perforations 23 through which cleaning fluid is adapted to be discharged, this fluid flowing out between the edges of the wiper members and being spread on the windshield glass to soften the dirt thereon so it will be removed by the wiper. Because the rubber edges are normally in contact or closely spaced, the liquid stream emerging therefrom is spread out along the length of the wiper so that it supplies a uniform stream of liquid to the glass.

In the form illustrated, the wiper is assembled by wrapping a suitable sheet of rubber or the like about the discharge tube and holding it in place by means of a holder or clamp member 25, the two longitudinal edges of the rubber member extending out of the holder to form the adjacent wiping or scrubbing edges 21a.

Mounted preferably on the inside of windshield frame 11 is a supply tank 31 for the cleaning fluid to be used in the windshield wiper. This tank is preferably mounted in releasable clamps 32 so that the tank can if desired be removed from the windshield for convenience in refilling, and is provided with a screw-cap 33. A delivery tube 34 is connected to tank 31 and leads through an opening in the windshield frame to a swivel member 35 rotatably mounted on tubular member 16 between a flange 36 and a removable holding ring 37 thereon, as clearly shown in Fig. 2. Within swivel member 35, tube 34 communicates with a liquid passage 38 provided through the wall of the tubular member 16, and passage 38 communicates with a bore 39 drilled into member 16 from its outer end. Fitted in this bore 39 is a delivery tube 40 which leads to the discharge tube 22 of the wiper member. A rubber hand-bulb 31a is attached to tank 31 for the purpose of forcing liquid from the tank through the supply tube 34 in the operation of the wiper.

In service, the wiper is driven in the usual manner, either manually or by means the wiper motor, and the bulb 31a is squeezed to force the cleaning fluid from the tank through the supply tube 34 and into the stationary swivel member 35, where it enters the passage way 38 of the moving mounting member 16 affixed to shaft 13, and from there passes through bore 39 and the delivery tube 40 to reach the discharge tube 22, where it flows out of the perforations. This cleaning fluid is then spread on the windshield glass by the edges of the wiper rubber, and softens the dirt thereon so that it is easily and effectively removed by the wiper.

It is to be noted that the supply tube 34 and swivel member 35 are stationary, while the tubular mounting member 16 moves with the drive shaft 13 of the wiper, and hence the delivery tube 40 swings with the wiper and therefore can be, and preferably is, a non-flexible tube, to obvious advantage.

It will now be seen that I have provided an extremely simple and reliable device by means of which my improvements can readily be installed in association with the drive shaft already provided on the usual windshield wiper.

It will be understood the drawing and description are to be considered merely as illustrative of and not restrictive on the broader claims appended hereto, for various changes in design, structure and arrangement may be made without departing from the spirit and scope of said claims.

I claim:—

1. In a device of the character described, an externally threaded cylindrical body having an internal bore extending inwardly from its rear end and within which the exterior end of the drive shaft of a windshield wiper is adapted to be received, the end of said drive shaft coming against the inner end of said bore, there being registering drill holes through said body and drive shaft adapted to receive the arm of a windshield wiper, and a nut screw-threaded on the rear end of said body and adapted to be set up against the wiper arm to clamp the wiper arm in position and to hold the body on the drive shaft.

2. In a device of the character described, an externally threaded cylindrical body having an internal bore extending inwardly from its rear end and within which the exterior end of the drive shaft of a windshield wiper is adapted to be received, there being registering drill holes through said body and drive shaft adapted to receive the arm of a windshield wiper, and a nut screw-threaded on the rear end of said body and adapted to be set up against the wiper arm to clamp the wiper arm in position and to hold the body on the drive shaft.

In witness that I claim the foregoing I have hereunto subscribed my name this 17 day of March, 1930.

CLARENCE B. WILLIAMS.